March 29, 1966   H. WESSNER   3,243,251
PLURAL ROW CAMERA WITH AUTOMATIC STOPPING
Filed Jan. 31, 1964
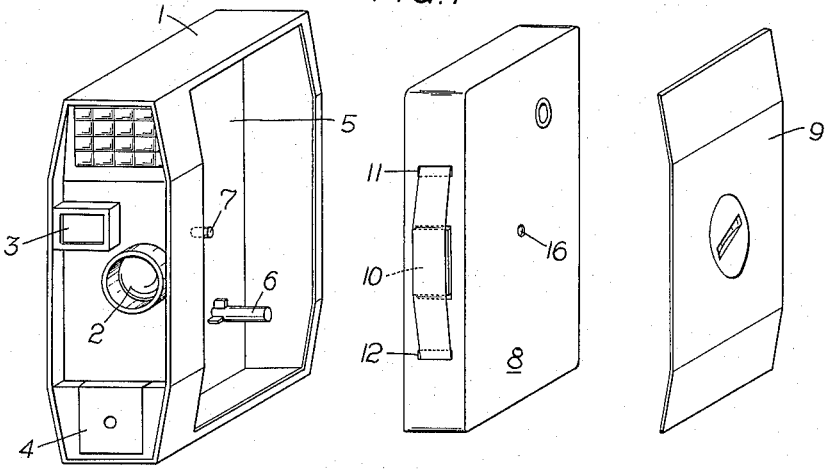
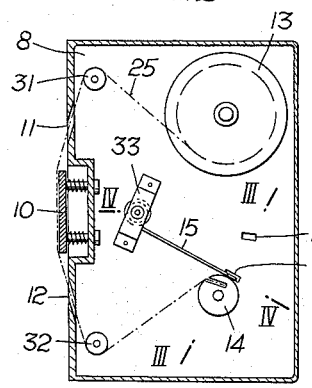
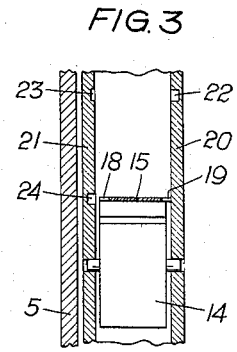
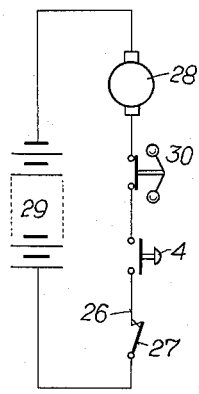
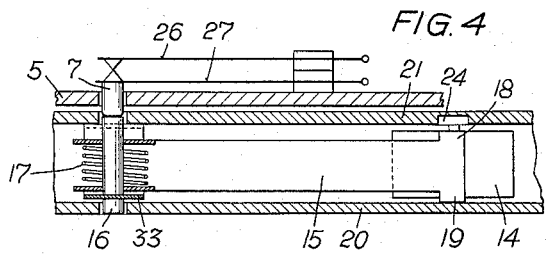

United States Patent Office 3,243,251
Patented Mar. 29, 1966

3,243,251
PLURAL ROW CAMERA WITH AUTOMATIC
STOPPING
Harald Wessner, Vienna, Austria, assignor to Karl Vockenhuber and Raimund Hauser, both of Vienna, Austria
Filed Jan. 31, 1964, Ser. No. 341,656
Claims priority, application Austria, Feb. 12, 1963,
A 1,074/63
5 Claims. (Cl. 352—83)

The invention relates to a cinematographic camera with a magazine for films having two columns of pictures, arranged side by side in opposite direction, and with a feeler lever or the like, rotatably mounted, which scans the diameter of one film reel and on a certain diameter of the film roll axially adjusts a control pin, movably arranged in parallel with the film reels and against the action of a spring releases the locking device of the camera.

It is said object of the invention to arrest the driving mechanism of the film, before the film end leaves the supply reel, so that, on turning the magazine in order to expose the second picture column it is not necessary to fasten the film end again on the film reel.

In a known arrangement of the above mentioned kind the feeler releases the control pin, when the supply reel has reached a certain diameter. A pin resting against the control pin under the action of a spring moves the control pin in an axial direction and thus releases the locking device of the driving mechanism of the camera.

The present invention is a further development of the known arrangement and is characterized in that the feeler lever is fastened on the mentioned control pin and, together with the same, is movable in the direction of its axis of rotation and, under the action of the said spring of the locking device, is supported against the inside wall of the magazine with at least one extension being directed in parallel with the axis of rotation and that on the inside wall of the magazine in the range of motion of this extension at least one recess is provided with which the extension of the feeler lever comes into mesh and thus, as a result of the axial movement taking place at the same time, releases the locking device. The present invention distinguishes itself by an extraordinary simplicity and a high reliability in operation.

One embodiment of the invention will now be described with reference to the accompanying drawing in which:

FIGURE 1 shows a diagrammatic representation of an 8 mm. camera for substandard film with a magazine;

FIG. 2 is a sectional view of the magazine;

FIGS. 3 and 4 are sectional views of details of the magazine along the lines III and IV, respectively of FIG. 2 in a larger measuring scale; and FIG. 5 is a circuit diagram of the camera.

Referring now to the drawing, FIG. 1 shows an electromotive driven camera for substandard film 1 which is adapted for double 8 mm. films. 2 is the camera objective, 3 is the viewfinder lens and 4 is the releaser. The lid 9 of the camera is taken off, so that the driving pin 6 for the take-up reel as well as a pin 7 of the locking device of the driving mechanism of the camera may be seen in the space provided to take the magazine 8.

The magazine 8 is adapted to take a film in daylight loading spools. During exposing of the first picture column, the film 25 is unwound from the reel 13, passes the guide pin 31 and proceeds between the apertures 11 and 12 on the outside of the housing of the magazine. By means of the pressure plate 10, provided on the magazine, the film is pressed on the film gate of the camera which is not represented in the drawing. After having passed the intake port 12, the film is led around the guide pin 32 and is wound up on the spool core 14. The lateral guiding of the film roll, wound up on the core 14, is directly effected by the inside walls of the housing of the magazine. A pin 16 is rotatably and axially movable mounted in the transverse plane of symmetry of the magazine, on which pin the feeler lever 15 is fastened. This feeler lever is pressed against the roll 14 by means of a spring 17, the one end of which is fastened on the lever 15 and the other end of which is fastened on the bearing cap 33 for the pin 16. When the magazine is inserted into the camera, the pin 16 meets the pin 7 which is held on the wall 5 by the contact spring 27, whereby on the one hand the feeler lever with its lugs 18 and 19, respectively leans against the inside wall of the magazine and on the other hand the contact spring 27 presses against the contact 26 and thus closes the motor circuit. By pressing the releaser 4, the camera may now be put into operation. On the inside walls 20 and 21 of the magazine the recesses 22, 23 and 24 are provided in the path of the lugs 18 and 19 respectively. If the feeler lever 15 meets with its lugs 18 and 19, respectively, the recesses 22 and 24, the contact spring 27 can move the pin 16 and with it the feeler lever 15 in an axial direction, whereby the lugs 18 and 19 respectively engage the corresponding recess. As a result of the release of the contact spring 27 the switches 26 and 27 are open and thus the driving motor 28 of the camera is arrested. Compared with the recesses 22 and 24, the recess 23 is essentially more shallow. When the lug engages this recess, the axial movement of the pin 16 does not suffice to open the switches 26 and 27.

The mode of operation of the new arrangement is as follows: In order to expose the first picture column of the film the daylight loading spool 13 is inserted into the magazine 8 in the manner as indicated in FIG. 2, and the end of the film 25 is led over the guide roll 31, the pressure plate 10 and the second guide roll 32 to the spool core 14 and is fastened on the latter. Under the action of the spring 17, the feeler lever 15 leans against the film wound up on the spool core 14. If the magazine 8 is inserted into the camera in such a manner, that the spool core 14 is engaged by the pin 6, the feeler lever 15 is supported with its lug 19 against the wall of the magazine and thus closes the switches 26, 27. Upon exposing the film the diameter of the roll 14 increases, whereby the feeler lever 15 is moved upwards.

Before the trailer has run off, the lug 19 engages the recess 22 and thus arrests the camera. The magazine 8 is now turned over, whereby the reel 13 meets the pin 6. The feeler lever 15 is pressed against the wall 21 of the magazine by means of the pin 7 and the lug 18 engages the recess 23. This recess is so shallow that although the switches 26, 27 are closed, the feeler lever 15 cannot follow the decreasing film roll upon the run-off of the film for exposing the second picture column. This is essential insofar that, in order to get a good steadiness of the picture, a braking of the supply reel has to be avoided. Upon the passing of the second side of the film it is intentionally renounced to arrest automatically the driving mechanism of the camera, when the effective length of the film has passed. The film end leaves therefor the spool core 14 and is completely wound up on the spool 13. Errors resulting in that a magazine, containing a film already exposed, is inserted into the camera, are thus deleted.

In order to avoid that the camera is put into operation with a wrongly inserted magazine—with the reel 13 on the pin 6—a recess 24 is provided on the wall 21 of the magazine. If the magazine is wrongly inserted, the lug 18 engages the said recess and effects the interruption of the circuit of the motor 28. It is thus avoided, that the leader of the film is unwound from the spool core 14.

FIG. 5 shows the circuit diagram of the camera. The speed of rotation of the driving motor 28 of the camera is stabilized by the centrifugal switch 30. With 29 the batteries are designated. The contacts 26 and 27 are arranged in the circuit of the camera motor in series with the releaser 4. Thus, the driving mechanism is arrested, when these contacts are open.

The invention is not restricted to the above described embodiment. It may also be used with the same advantages in cameras having a spring mechanism wherein, instead of the contacts 26 and 27, the pin 7 controls an arresting device for the spring-wound motor. This arresting device may consist in a known manner of a locking device for the claw shaft and the shutter shaft respectively of the camera.

While I have disclosed one embodiment of the present invention, it is to be understood that this embodiment is given by example only and not in a limiting sense, the scope of the present invention being determined by the objects and the claims.

What I claim is:

1. A cinematographic camera adapted to expose films having two colums of pictures arranged side by side in opposite direction, a magazine, a film supply reel and a film take-up reel rotatably mounted on parallel axles within said magazine, a feeler lever, an axle carrying said feeler lever being parallel with the axles of the film reels and mounted rotatably and movably in axial direction within said magazine, resilient means holding said feeler lever in engagement with the film wound up on one of said two reels, film driving means, arresting means for said film driving means, a pin axially movable within said camera arranged opposite said axle of the said magazine carrying the said feeler lever, resilient means holding the said pin in engagement with the axle carrying said feeler lever, said pin being adapted to control said arresting means and to effect an arresting of the camera driving means when it is axially displaced, said feeler lever having at least one extension directed parallel with the axis of rotation and which under the action of said pin is pressed on the inside wall of said magazine and sliding thereon, at least one recess being provided in said inside wall in the range of motion of this extension with which the extension of said feeler lever comes into mesh and thus as a result of the axial movement of said feeler lever and said pin the latter effects the arresting of said film driving means.

2. The cinematographic camera as claimed in claim 1, wherein the said recess is provided on the inside wall of the said magazine in a position, that the extension of said feeler lever comes in mesh with said recess when said film take up reel has reached a maximum diameter.

3. A cinematographic camera adapted to expose films having two columns of pictures arranged side by side in opposite direction, a magazine, a film supply reel and a film take-up reel rotatably mounted on parallel axles within said magazine, a feeler lever, an axle carrying said feeler lever being parallel with the axles of said film reels and mounted rotatably and movably in axial direction within said magazine, resilient means holding said feeler lever in engagement with the film wound up on one of said two reels, film driving means, means coupling said film driving means and that reel which is adapted to receive said film after exposure, arresting means for said film driving means, a pin axially movable within said camera and arranged opposite said axle of the said magazine carrying the said feeler lever, resilient means holding the said pin in engagement with the axle carrying said feeler lever, said pin being adapted to control said arresting means and to effect an arresting of the camera driving means when it is axially displaced, said feeler lever having at least two extensions directed parallel with the axis of rotation and which under the action of said pin are pressed on the inside wall of the magazine and sliding thereon, recesses provided in the opposite inside walls in the range of motion of these extensions, the latter engaging said recesses and due to the axial movement of the feeler lever and said pin, the latter effects the arresting of said film driving means, a first recess being provided in a position, that it is engaged by a first extension of said feeler lever, when the take-up reel has reached a maximum diameter, a second recess being provided on the opposite inside wall in a position that it is engaged by a second extension of said feeler lever when said film take-up reel has a minimum diameter and said magazine is inserted into the camera in a position in which the coupling means come in mesh with the film supply reel.

4. The cinematographic camera as claimed in claim 3 with the feeler lever lying on said film supply reel of the camera when exposing the second column of pictures of said film, a further recess being provided on the last mentioned inside wall, the depth of the said recess being reduced compared with the depth of the said other recesses, the recess being provided in a position that it is engaged by an extension of said feeler lever, when inserting said magazine ready for exposing the second column of pictures of said film, said recess locking said feeler lever but due to the reduced depth does not effect an arresting of said camera driving means.

5. A cinematographic camera adapted to expose films having two columns of pictures arranged side by side in opposite direction, a magazine, a shaft adapted to receive a film reel, a flangeless film take-up reel rotatably mounted within said magazine with an axis parallel to said shaft, a feeler lever, an axle carrying said feeler lever being parallel with the axles of said film reels, the said axle being held in holes, lying in a plane of symmetry with respect to the axes of the said shaft and said take-up reel, penetrating the side walls of said magazine rotatably and movably in axial direction, resilient means holding said feeler lever in engagement with said flangeless film take-up reel, film driving means, means coupling said film driving means on the one hand and the said shaft and said take-up reel, respectively, on the other hand, arresting means for said film driving means, a pin axially movable within said camera and arranged opposite said axle of the said magazine carrying the said feeler lever, resilent means holding the said pin in engagement with the axle carrying said feeler lever, said pin being adapted to control said arresting means and to effect an arresting of said film driving means when it is axially displaced, said feeler lever having at least one extension on the end of said lever lying on said film reel, being directed parallel with the axis of rotation and which under the action of said pin is pressed on the inside wall of said magazine and sliding thereon, at least one recess being provided in said inside wall in the range of motion of said extension with which the extension of said feeler lever comes into mesh and thus as a result of the axial movement of said feeler lever and the said pin the latter effects the arresting of said film driving means.

References Cited by the Examiner
UNITED STATES PATENTS
2,987,956   6/1961   Planert et al. _____ 352—83 X NORTON ANSHER, *Primary Examiner.*